(12) United States Patent
Rasolofosaon et al.

(10) Patent No.: US 7,974,785 B2
(45) Date of Patent: Jul. 5, 2011

(54) METHOD FOR QUANTITATIVE EVALUATION OF FLUID PRESSURES AND DETECTION OF OVERPRESSURES IN AN UNDERGROUND MEDIUM

(75) Inventors: Patrick Rasolofosaon, Les Ulis (FR); Thierry Tonellot, Rueil-Malmaison (FR)

(73) Assignee: Institut Francais du Petrole, Cedex (FR)

( * ) Notice: Subject to any disclaimer, the term of this patent is extended or adjusted under 35 U.S.C. 154(b) by 366 days.

(21) Appl. No.: 12/093,624

(22) PCT Filed: Nov. 13, 2006

(86) PCT No.: PCT/FR2006/002522
§ 371 (c)(1),
(2), (4) Date: Oct. 2, 2008

(87) PCT Pub. No.: WO2007/057560
PCT Pub. Date: May 24, 2007

(65) Prior Publication Data
US 2009/0093963 A1 Apr. 9, 2009

(30) Foreign Application Priority Data
Nov. 14, 2005 (FR) ..................................... 05 11530

(51) Int. Cl.
*G01V 1/30* (2006.01)
(52) U.S. Cl. ................... 702/6; 702/14; 367/38; 367/47
(58) Field of Classification Search .............. 702/6, 12, 702/14; 367/38, 47, 57
See application file for complete search history.

(56) References Cited

U.S. PATENT DOCUMENTS
6,529,833 B2 * 3/2003 Fanini et al. ...................... 702/7
6,977,866 B2 * 12/2005 Huffman et al. ................ 367/73

FOREIGN PATENT DOCUMENTS
WO WO 01/73476 A1 10/2001

OTHER PUBLICATIONS

Rasolofosaon, et al., "Petroacoustic Characterization of Reservoir Rocks for Seismic Monitoring Studies", Nov. 2003, Oil and Gas Science and Technology, Ed. Technip, Paris, Fr, pp. 615-635, XP002277173, ISSN: 1294-4475.
Rasolofosaon, et al., "Laboratory Petroacoustics for Seismic Monitoring Feasibility Study", The Leading Edge, Mar. 2004, pp. 252-258, XP002392555 p. 253.
Durrast et al., "P-waveVelocity and Permeability distribution of Sandstones from a Fractured Tight Gas Reservoir" Geophysics, SEG, vol. 67, No. 1, Jan. 2002, pp. 241-253, XP002392556.

* cited by examiner

*Primary Examiner* — Bryan Bui
(74) *Attorney, Agent, or Firm* — Antonelli, Terry, Stout & Kraus, LLP.

(57) ABSTRACT

Method for evaluating fluid pressures in an underground zone by means of seismic and well data. The zone studied is divided into several time analysis intervals. For each of these intervals, a pre-stack stratigraphic inversion of the seismic data is then carried out using geological a priori information, and a lithoseismic facies cube is determined by lithoseismic analysis. Then, for each facies, relations connecting the seismic impedances of wells to differential pressures in wells are determined in each analysis interval. Finally, a differential pressure cube is determined using the previous relations, as well as a confining pressure cube, in order to determine the fluid pressures in the subsoil by simple difference between these two cubes. Application: petroleum sphere for the detection of overpressure zones during drilling for example.

17 Claims, 4 Drawing Sheets

METHOD FOR QUANTITATIVE EVALUATION OF FLUID PRESSURES AND DETECTION OF OVERPRESSURES IN AN UNDERGROUND MEDIUM

FIELD OF THE INVENTION

The present invention relates to a method for quantitative evaluation of fluid pressures in the subsoil with a good spatial resolution by means of seismic and well data by taking into account the geological varieties of the media crossed.

The method can be used in the petroleum sphere for the detection of overpressure zones for drilling.

BACKGROUND OF THE INVENTION

The following documents, mentioned in the description hereafter, illustrate the state of the art:

Barnola, A. S., Andrieux B., Tonellot T., Voutay O., 2003, Pre-stack stratigraphic inversion and attribute analysis for optimal reservoir characterization, 73rd Ann. Internat. Mtg: Soc. of Expl. Geophys., 1493-1496, Dallas.

Bertrand, C., Tonellot T., Fournier F., 2003, Seismic facies analysis applied to P and S impedances from pre-stack inversion, 72nd Ann. Internat. Mtg: Soc. of Expl. Geophys., 217,220.

Bourbié, T., Coussy, O., Zinszner, B., 1987, Acoustics of porous media, Editions Technip, Paris.

Brac J. P. et al., 1988, Inversion with A Priori Information: An Approach to Integrated Stratigraphic Interpretation, Reservoir Geophysics R.E. Sheriff ed. Investigation in Geophysics, 7, SEG, Tulsa.

T. Tonellot, D. Macé, V. Richard, 1999, Prestack elastic waveform inversion using a priori information, 69th Ann. Internat. Mtg: Soc. of Expl. Geophys., paper 0231, p. 800-804.

Eberhart-Phillips, D., Han, D.-H., and Zoback, M. D., 1989, Empirical relationships among seismic velocity, effective pressure, porosity, and clay content in sandstone: Geophysics, 54, 82-89.

Grauls, D., Dunand, J. P., Beaufort, D., 1995, Predicting abnormal pressure from 2D seismic velocity modeling: Offshore Technology Conference, paper OTC 7692.

Harkins, K. L., Baugher, J. W., 1969, Geological significance of abnormal formation pressures: *J. Petroleum Geol.*, 961-966

Lucet, N., Déquirez, P.-Y. and Cailly, F., 2000, Well to seismic calibration: A multiwell analysis to extract one single wavelet, 70th Ann. Internat. Mtg: Soc. of Expl. Geophys., 1615-1618.

Pennebecker, E. S., 1968, Seismic data indicate depth, magnitude of abnormal pressure: *World oil,* 166, 73-78

Reynolds, E. B, 1970, Predicting overpressured zones with seismic data: *World oil,* 171, 78-82.

Shapiro, S. A., 2003, Elastic piezosensitivity of porous and fractured rocks: Geophysics, 68, 482-486.

Tonellot, T., Macé, D. and Richard, V., 2001, Joint stratigraphic inversion of angle-limited stacks, 71st Ann. Internat. Mtg: Soc. of Expl. Geophys., 227-230.

Voutay, O., Fournier, F. and Royer, J., 2002, Seismic interpretation with new attributes extracted from a prestack multicube analysis, 72nd Ann. Internat. Mtg: Soc. of Expl. Geophys., 1762-1765.

Yilmaz, O., 1987, Seismic Data Processing: *Soc. of Expl. Geophys.,* 526. Zimmerman, R. W., 1984, The effect of pore structure on the pore and bulk compressibility of consolidated sandstones: Ph.D. dissertation, University of California at Berkeley.

The presence of overpressure zones under exploration can have serious financial and sometimes human consequences during drilling if the fluid pressures are not known. Prediction of the presence of overpressure zones and, more generally, quantitative evaluation of these overpressures has become a priority for oil companies. In fact, in the sphere of exploration, the fluid pressure can be close to the minimum principal stress and induce the re-opening of fractures or possibly initiate hydraulic fracturing. In the sphere of drilling, it is important to know the pressure difference between the fluid pressure and the minimum stress in place for the design of well casings, and to predict the mud weight so as to prevent blowouts in underbalanced drilling or drilling mud losses in overbalanced drilling. Finally, depletion in overpressure zones can induce notable stress redistributions, possibly with great consequences on the productivity of reservoirs. Thus, a good quantitative evaluation of the fluid pressures and of their connections with the stress variations is also important in the sphere of production.

There are many methods allowing quantitative evaluation of fluid pressures from physical measurements (and not from modeling): formation tests, drill bit drilling rate, clay density measurements, gas shows, fluid flow rate measurements, wireline logging, etc. Among these methods, the geophysical methods, and more particularly the seismic methods, having a higher spatial resolution than their competitors (gravimetry for example) are the only ones allowing this at a distance from wells. It is therefore essential to best exploit the seismic data.

However, the conventionally used seismic processings of velocity analysis type (Yilmaz, 1987) have a limited efficiency (Pennebaker, 1968, Grauls et al., 1995), mainly because, on the one hand, of their spatial resolution, too weak to be efficiently used for drilling and, on the other hand, because they do not take sufficiently into account the lithologic variations (Reynolds, 1970), often critical in overpressure phenomena. In order to understand these main technical problems, the conventional procedure for quantitative evaluation of overpressures from seismic data is summarily described. The various stages are as follows:

obtaining a seismic velocity model that is as precise as possible, through fine velocity analysis, deducing a reference compaction curve (seismic velocity as a function of depth) referred to as "normal compaction" curve (corresponding to the hydrostatic distribution of the fluid pressure), interpreting the differences between the compaction curve measured with the seismic method and the normal compaction curve in terms of fluid pressure anomalies. The anomalies (or deviations in relation to the hydrostatic distribution) can be positive (overpressures) or negative.

The main problems of these methods are, on the one hand, the relatively low spatial resolution of the conventional methods that make them difficult to use for drilling operations. The second problem is the implicit assumption according to which any anomalic velocity change is attributed to an overpressure, while dismissing for example causes such as the lithology change (Reynolds, 1970, for example). Lithologic verification is performed a posteriori in the conventional method. In other words, one checks after all the processings that the pressure anomalies are not due to a lithologic variation.

The method provided, based on pre-stack inversion of seismic data, allows these two major drawbacks to be overcome by providing a fluid pressure cube at a sufficiently precise scale for the drill man while taking into account the lithology explicitly in the processing.

SUMMARY OF THE INVENTION

The invention relates to a method for evaluating fluid pressures in an underground zone by means of well data obtained from at least one well and seismic data comprising at least one seismic cube discretizing said zone into elementary volumes located by their horizontal (x,y) and vertical coordinates in time (t). The method comprises the following stages:

a) defining at least one time analysis interval for said zone, b) performing in said analysis interval a pre-stack stratigraphic inversion of said seismic data, using geological a priori information, so as to construct at least one seismic impedance cube, c) determining a lithoseismic facies cube by carrying out a lithoseismic analysis comprising interpretation of said seismic impedance cube in terms of lithoseismic facies from said well data, d) determining from said well data seismic impedances in said well expressed in time, as well as differential pressures in said well, also expressed in time, e) determining for each of said lithoseismic facies at least one petro-acoustic relation connecting said seismic impedances in said well to said differential pressures in said well, in said analysis interval, f) determining a differential pressure cube by converting said seismic impedance cube by means of said petro-acoustic relation and said lithoseismic facies cube, g) determining a confining pressure cube from said seismic impedance cube, h) determining said fluid pressures over all of said zone, by calculating the difference between said differential pressures and said confining pressures.

According to the method, the seismic data can be 3D P wave monocomponent seismic data partially stacked by angle class after preserved amplitude processing and NMO correction. In this case, pre-stack stratigraphic inversion can comprise the following stages:

extracting for each angle class a wavelet coherent with said well data, constructing an a priori model comprising a P wave impedance a priori cube and an S wave impedance a priori cube, performing a pre-stack stratigraphic inversion of all the cubes defined for each angle class, from said wavelet and said a priori model.

Lithoseismic analysis can comprise a generalized principal component analysis followed by a lithoseismic facies analysis calibrated by means of said well data. This lithoseismic analysis can allow at least to discriminate between clayey facies and sandy facies.

According to a particular embodiment, the well data can comprise at least the following depth data (z):

seismic velocities obtained from acoustic logs, total density ρ(z), fluid pressure $P_{pore}(z)$.

The well data provided as a function of depth z can then be converted as function of time t, from the following formula:

$$t = \int_0^z \frac{2dz}{V_P(z)}$$

where $V_P(z)$ represents the P wave seismic velocities.

According to the invention, it is then possible to determine said petro-acoustic relation, in time, by carrying out the following stages:

calculating for said well seismic impedances from the total density and said seismic velocities, calculating confining pressures from the seismic velocity and total density data, for each time interval of the well data, calculating differential pressures by the difference between the fluid pressure in said well $P_{pore}(t)$ and the confining pressure, for each time interval of the well data, estimating a relation from the seismic velocity data and the differential pressure data.

The confining pressure cube $P_{conf}(x, y, t)$ can be determined from the following equation:

$$P_{conf}(x, y, t) = \int_0^t \frac{1}{2} I_P(x, y, t) g dt$$

where $I_P(x,y,t)$ represents an acoustic impedance cube.

From the method, it is possible to detect overpressure zones for a wellbore, by applying a threshold criterion to said fluid pressures.

Furthermore, by carrying out a time/depth conversion of the evaluated fluid pressures, overpressure zones can be located in depth and it is then possible to modify the drilling conditions according to the location and to the intensity of the overpressure zones. For example, the trajectory of the wellbore can be modified so as to avoid said overpressure zones, or the drilling fluid injection pressure can be modified to compensate for the overpressures of the fluids in the subsoil.

The method can also allow to evaluate the underground fluid pressures at depths that have not yet been reached by the wellbore, by estimating lithologies of depths not yet reached by a wellbore by means of said lithologies of depths already reached, and by applying for each of said lithoseismic facies said petro-acoustic laws and said wavelets corresponding to the deepest time analysis interval. In this case, it is possible to predict the overpressure zones at depths that have not yet been reached by the wellbore.

Finally, according to the invention, if there are not enough logs available, one may assume that the fluid pressures are hydrostatic and at least one of the following data can be used:

seismic velocities estimated from conventional velocity analyses, densities estimated from said seismic velocities estimated by means of Gardner's empirical relations.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

The method allows to evaluate the fluid pressures of an underground zone from well data and seismic data. It mainly comprises the following six stages:

1) Defining time analysis intervals.
2) Processing the seismic data over each analysis interval: seismic impedance cubes and lithoseismic facies cube.
3) Processing the well data over each analysis interval: petro-acoustic relation between seismic impedance in wells and differential pressure in wells.
4) Determining a differential pressure cube ($P_{diff}(x,y,t)$).
5) Determining a confining pressure cube ($P_{conf}(x,y,t)$).
6) Determining a fluid pressure cube ($P_{pore}(x,y,t)$).

Figure 1:
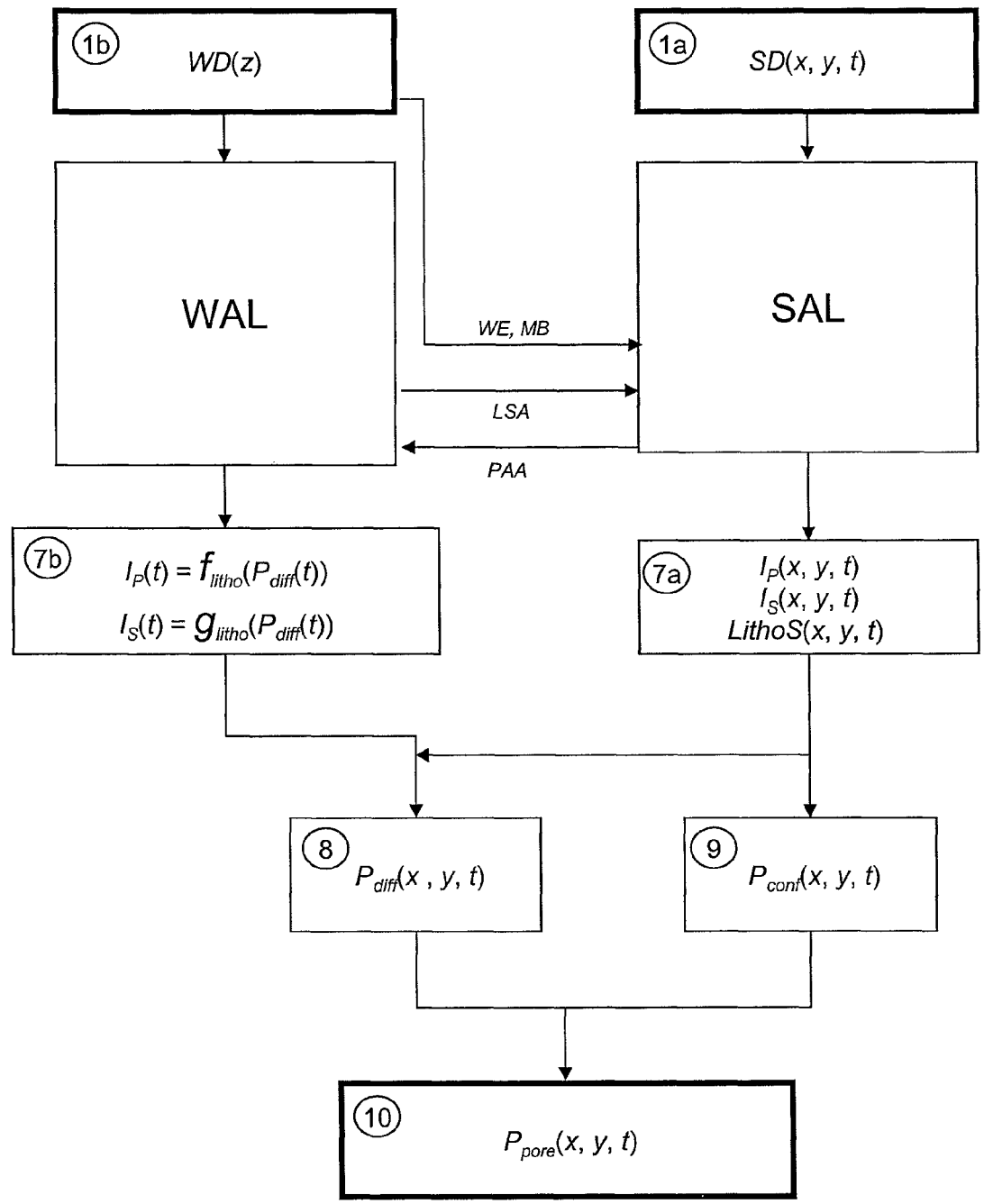
FIG. 1 is a general illustration of the various stages of the method.
Figure 2:
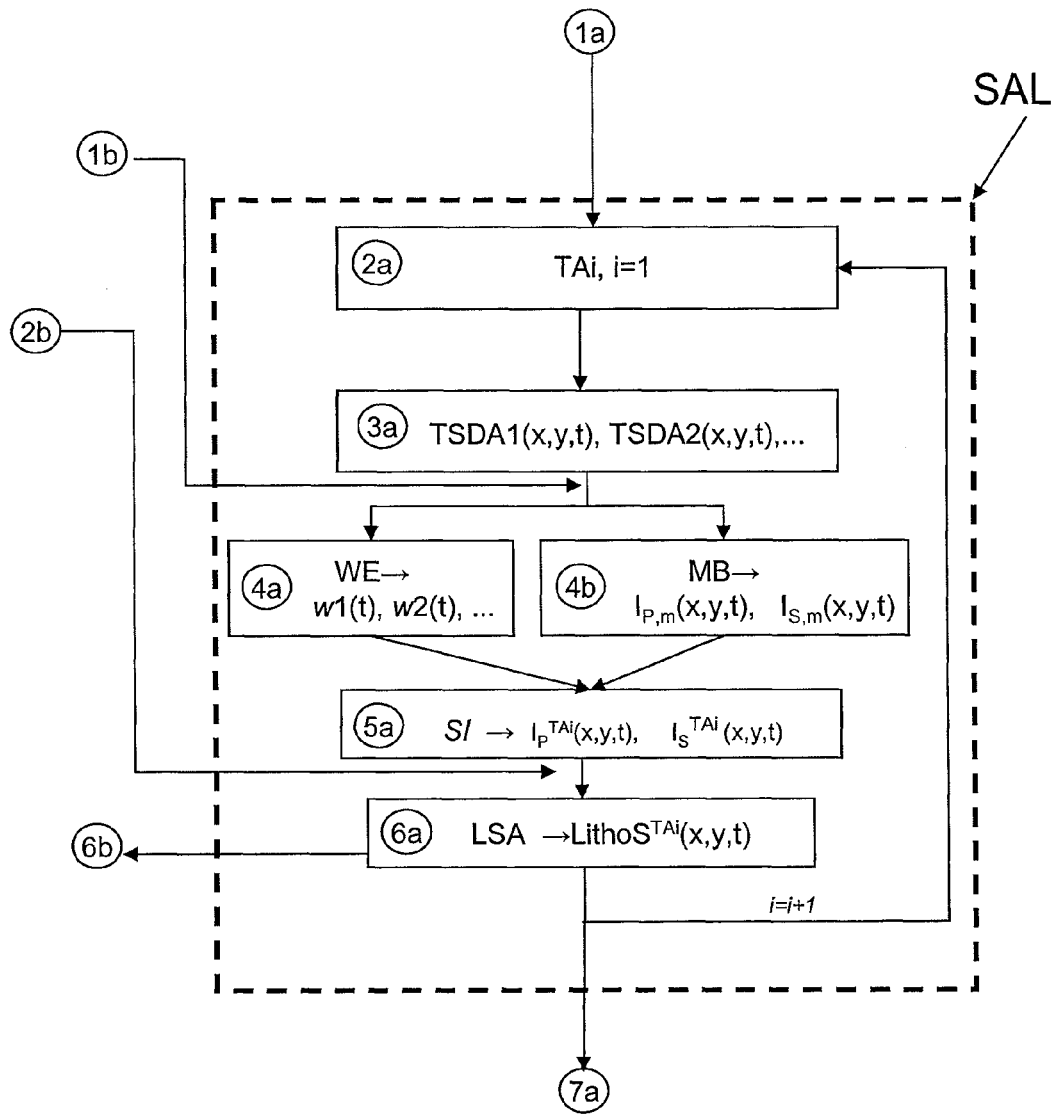
FIG. 2 shows in detail the part of FIG. 1 corresponding to the seismic analysis loop (SAL)
Figure 3:
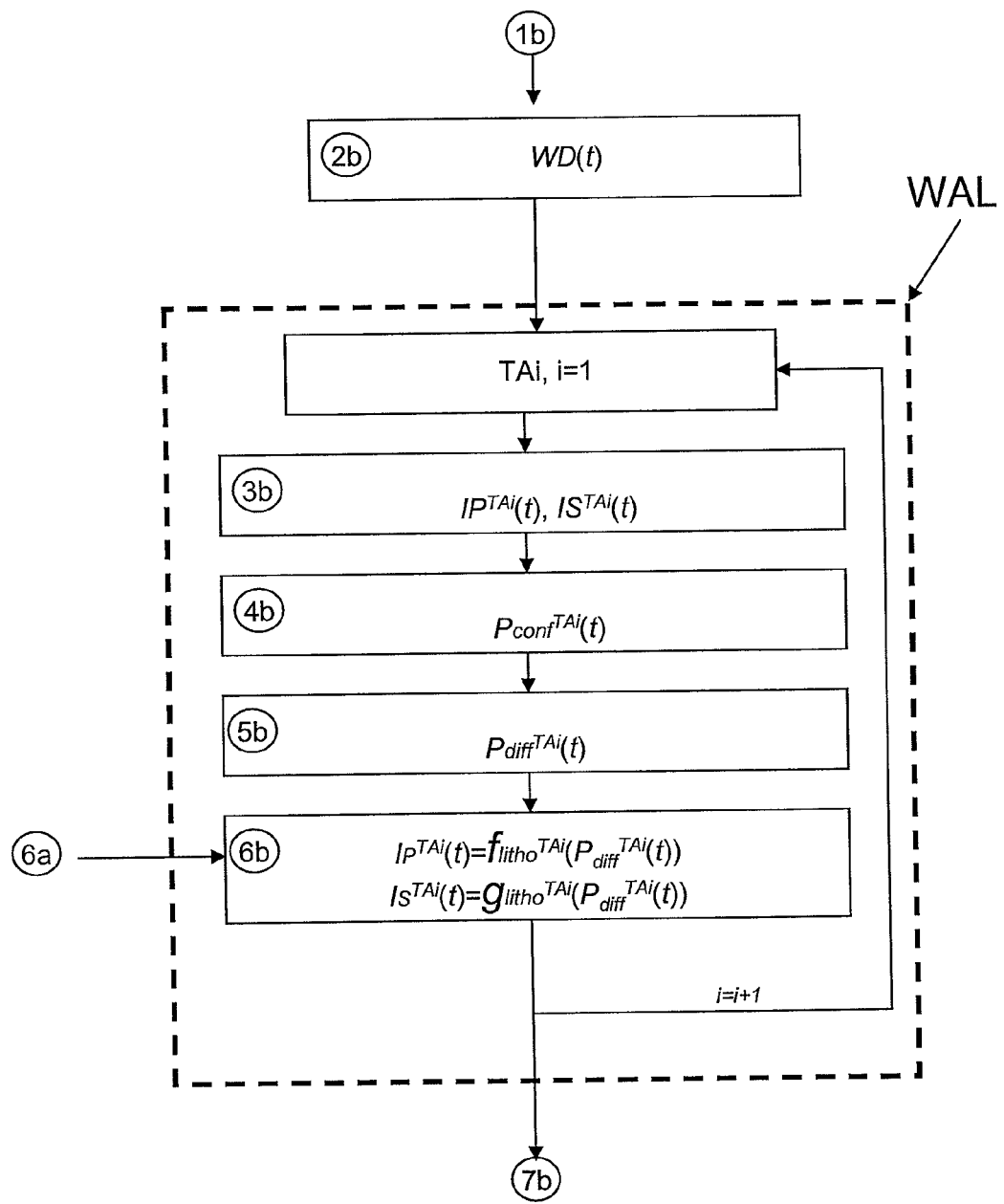
FIG. 3 shows in detail the part of FIG. 1 corresponding to the well data analysis loop (WAL)

The various stages of the method are diagrammatically shown in FIGS. 1 to 3. FIG. 1 is a general illustration of the various stages of the method. As described more in detail below, these stages consist of two interconnected subsets of stages, i.e., on the left side of the figure, the stages corresponding to the well data processing (detailed in FIG. 3) and, on the right side of the figure, the stages corresponding to the seismic data processing (detailed in FIG. 2). According to the usual convention, the rectangles contain the input data or the results obtained at a certain processing stage, the stage being identified by a figure possibly followed by a small roman letter (1*a*, 3*b* or 9 for example). These rectangles are connected by predominantly descending arrows oriented in the sequential direction of processing, from the input of the data (top of the figure) to the final output of the results (bottom of the figure). To clarify the description, the rectangles are sometimes accompanied by a very summary description of the technique (SI, MB, LSA, . . . ) allowing to go from one result to the next.

According to the method, fluid pressures are evaluated in an underground zone in form of a cube discretizing the zone to be studied. This discretization consists in dividing the zone into elementary volumes identified by their horizontal (x,y) and vertical coordinates, either in time (t) or in depth (z).

1) Defining Time Analysis Intervals

According to a particular example, the data are composed of:
the seismic data, SD(x, y, t), which are pre-stack 3D P wave monocomponent seismic data acquired during a stage 1*a*,
the well data, WD(z), acquired during a stage 1*b*, mainly comprise:
the seismic velocities obtained from acoustic logs: P wave velocity denoted by $V_P(z)$, and possibly S wave velocity denoted by $V_S(z)$,
the total density, denoted by $\rho(z)$,
the fluid pressure, denoted by $P_{pore}(z)$,
the lithology type, such as carbonates, sandstones, clays, sand, etc., denoted by LithoG(z), where z is depth.

Horizons, also referred to as seismic markers, are identified from the seismic data. These horizons indicate seismic discontinuities, lithologic or not, characterized by a seismic impedance variation. One generally considers that the part of the subsoil contained between two horizons is homogeneous as regards its petro-elastic properties.

Thus, according to the method, the underground zone is divided into several time analysis intervals delimited by seismic horizons in order to obtain increased accuracy of results. Thus, each time analysis interval is processed separately to identify very specific properties (wavelet, relation between lithology and seismic data, etc.) and successively, to provide a global result described below. These time analysis intervals are generally selected below 500 ms, typically of the order of 300 ms to 400 ms.

2) Processing the Seismic Data Over Each Analysis Interval: Seismic Impedance Cubes and Lithoseismic Facies Cube The seismic data are first partially stacked by angle classes after preserved amplitude processing and NMO correction, using for example the method provided by Tonellot et al. (2001) (not shown in the figures). Typically, there can be five angle classes, i.e. 0°-6°, 6°-12°, 12°-18°, 18°-24° and 24°-30°. According to the quality of the data, additional angle classes (30°-36°, etc.) can be added, as suggested for example by Barnola et al. (2003). We therefore have at least five 3D cubes corresponding to each angle class selected.

We then carry out a stratigraphic inversion (SI) and a lithoseismic analysis (LSA) for each time analysis interval defined above. It is the seismic analysis loop (SAL).

First of all we start with a first time analysis interval, TAI (stage 2*a*), and we truncate the 3D cubes corresponding to each of the angle classes selected so as to limit ourselves to this first time analysis interval (stage 3*a*).

Then, from these truncated cubes (TSDA1(x, y, t), TSDA2 (x, y, t), . . . ), we carry out a pre-stack stratigraphic inversion (SI) while using geological a priori information. This technique is known to specialists and it is possible to use for example the techniques proposed by Brac et al. (1988), Tonellot et al. (1999) and Lucet et al. (2000). This inversion type comprises two phases. The first phase (WE), according to the method described by Lucet et al. (2000), consists in extracting for each truncated cube, i.e. for each angle class, the best wavelet (w1(t), w2(t), . . . ) coherent with the data observed in the well (stage 4*a*). The second phase (MB), described by Tonellot et al. (1999), consists in constructing an a priori 3D model (stage 4*b*) necessary for initiating and constraining the inversion in the next stage. It mainly consists of two 3D seismic impedance cubes, i.e. the P wave a priori impedance cube, denoted by $I_{P,m}(x, y, t)$, and the S wave a priori impedance cube, denoted by $I_{S,m}(x, y, t)$. Coordinates x and y are the two horizontal coordinates related to acquisition, typically on-line and cross-line. The third dimension is not depth z but the recording time t, directly related to the seismic measurement.

Finally, the inversion (SI) proper is performed. More precisely, knowledge of the wavelets and of the a priori model in the time analysis interval selected allows simultaneous inversion of all the 3D cubes (TSDA1(x, y, t), TSDA2(x, y, t) . . . ) via a pre-stack stratigraphic inversion according to the method described by Tonellot et al. (2001). This inversion produces two 3D seismic impedance cubes, i.e. the P wave seismic impedance cube denoted by $I_P^{TA1}(x,y,t)$ and the S wave seismic impedance cube denoted by $I_S^{TA1}(x,y,t)$ (stage 5*a*).

According to the method, it is not absolutely necessary in practice to obtain the two seismic impedance types, P and S, but most pre-stack inversion techniques produce both cube types.

After this first stratigraphic inversion stage, for the same time analysis interval (TAI), a lithoseismic analysis (LSA) of the seismic impedance cubes obtained is carried out by means of the well data. Lithoseismic analysis is an interpretation of 3D seismic impedance cubes in terms of seismic facies from the viewpoint of the various lithologies encountered in wells.

Lithoseismic analysis consists in interpreting seismic data in terms of facies, i.e. homogenous data groups. They are referred to as lithoseismic facies because these facies are seismic facies (groups of seismic variables) interpreted in terms of lithologic facies (sandstone, limestone, clay, etc.). This interpretation can be carried out a priori or a posteriori, depending on methods. One generally starts by defining a certain number of seismic attributes (amplitudes, frequencies, impedance, . . . ). This number can be advantageously reduced by means of a technique such as principal component analysis or generalized principal component analysis. From these attributes, classification techniques (discriminant analysis for example) are used to construct the seismic facies. If an a priori analysis of the facies is desired, attributes common to the well data (converted to time then) and to the seismic data have to be defined. Such methods are for example described by Bertrand et al. (2002), Voutay et al. (2002) and Barnola et al. (2003).

According to an embodiment, this analysis is achieved by carrying out a generalized principal component analysis (Voutay et al. (2002)) followed by a well calibrated lithoseismic analysis (a priori interpretation). Since overpressure phenomena are closely linked with the lithology, in particular the low sand content (Harkins and Baugher, 1969, for example), the analysis is mainly oriented in the direction of discrimination between clayey facies and sandy facies, and it can typically comprise at least two clayey facies, one more compact, thus less permeable than the second, a facies corresponding to a sand/clay mixture and a sandy facies (see for example Bertrand et al., 2002). The probability of the presence of an overpressure decreases from the first to the last facies. This analysis leads to a lithologic interpretation $LithoS^{TA1}(x, y, t)$ over the entire cube in the analysis interval (TAI) on the seismic scale, i.e. the measurement scale (stage 6a).

However, to carry out such an analysis (with a priori interpretation of the seismic facies), it is necessary to have the well data in time and not in depth. This is the reason why, in parallel with this seismic data processing, a well data processing is performed, one part of which consists in carrying out this depth/time conversion (stage 2b), this processing being described hereafter.

At the end of this seismic loop (SAL), the set of cubes $I_P^{TA1}(x,y,t)$, $I_P^{TA2}(x,y,t)$, ..., $I_S^{TA1}(x,y,t)$, $I_S^{TA2}(x,y,t)$, ..., and $LithoS^{TA1}(x, y, t)$, $LithoS^{TA2}(x, y, t)$, ..., allow to form three cubes representative of the entire zone studied (stage 7a):

$I_P(x,y,t)$ $I_S(x,y,t)$ $LithoS(x, y, t)$.

3) Processing the Well Data Over Each Analysis Interval: Petro-Acoustic Relations Depth/Time Conversion (Stage 2b)

In parallel with seismic data processing, the well data provided as a function of depth z in stage 1b, (WD(z)), are converted to functions of time t(WD(t)). This time t is the seismic recording time, also referred to as two-way time because it corresponds to the traveltime required for the seismic P wave to propagate in the subsoil and to return to the surface after reflection on a geological interface.

The depth/time conversion (stage 2b), i.e. switching from depth coordinates z to time coordinates t, is then carried out using the relation as follows:

$$t = \int_0^z \frac{2dz}{V_P(z)} \qquad (1)$$

After this depth/time conversion, the following data are available:

the seismic velocities obtained from the acoustic logs: velocity of the P waves denoted by $V_P(t)$, and possibly velocity of the S waves denoted by $V_S(t)$, the total density, denoted by $\rho(t)$, the fluid pressure, denoted by $P_{pore}(t)$, the lithology type, such as carbonates, sandstone, clays, sand, etc., denoted by $LithoG(t)$.

The well data analysis loop (WAL) is started, still in parallel, in each of the time analysis intervals defined above.

First of all we start with a first time analysis interval (TAI), the same as for the seismic analysis, while limiting ourselves to the well data available in this first time analysis interval.

Calculation of the Seismic Impedances in Wells (Stage 3b)

The seismic impedances in wells are calculated (stage 3b), for example $I_P(t)$ and $I_S(t)$, which are, by definition, related to velocities $V_P(t)$ and $V_S(t)$ and to density $\rho(t)$ by the following relations:

$$I_P(t)=\rho(t).V_P(t) \text{ and } I_S(t)=\rho(t).V_S(t) \qquad (2)$$

We thus obtain, in analysis interval TAI, the following data: $I_P^{TA1}(t)$ and $I_S^{TA1}(t)$.

Calculation of the Confining Pressure in Wells (Stage 4b)

Furthermore, the confining pressure, likened to the geostatic pressure, corresponding to a sediment column whose height is equal to the depth of the point considered, is given by the following relation:

$$P_{conf}(t) = \int_0^z \rho(z)g\,dz = \int_0^t \rho(t)g\frac{V_P(t)}{2}dt \qquad (3)$$

The first equality is due to the definition of the static pressure and the second equality is related to the depth/time conversion, knowing that the time considered corresponds to the two-way time (hence factor ½) with the outward travel in depth and the return travel to the surface of the P wave.

We thus obtain the following data in the analysis interval TAI: $P_{conf}^{TA1}(t)$.

Calculation of the Differential Pressure in Wells (Stage 5b)

The differential pressure $P_{diff}(t)$ is obtained by simple subtraction between confining pressure $P_{conf}(t)$ and pore pressure $P_{pore}(t)$:

$$P_{diff}(t)=P_{conf}(t)-P_{pore}(t) \qquad (4)$$

We thus obtain the following data in the analysis interval TAI: $P_{diff}^{TA1}(t)$.

Determining Relations Between $P_{diff}$ and the Impedances (PAA, Stage 6b)

Differential pressure $P_{diff}$ plays a central part in the dependence of the seismic velocities $V_P$ and $V_S$ as a function of the pressures, as illustrated by the extensive literature in the field of rock physics (for example Bourbié et al., 1987). More precisely, the dependence of velocities $V_P$ and $V_S$ as a function of the pressures can be summed up by functions depending only on differential pressure $P_{diff}$ and not on confining pressure $P_{conf}$ and pore pressure $P_{pore}$ separately. Thus, after elimination of the time parameter t between functions $I_P(t)$ and $P_{diff}(t)$, and between functions $I_S(t)$ and $P_{diff}(t)$, we can obtain the following petro-acoustic relations for each seismic lithologic facies identified in stage 6a, and for analysis interval TAI:

$$I_P^{TA1} = f_{litho}^{TA1}(P_{diff}^{TA1}) \text{ and } I_S^{TA1} = f_{litho}^{TA1}(P_{diff}^{TA1}) \quad (5)$$

We therefore group together, for analysis interval TAI, all the values of $I_P^{TA1}(t)$ and $P_{diff}^{TA1}(t)$ for a given lithologic facies. We construct, for this lithology, a cross plot wherein each point is located by a first coordinate corresponding to its value of $P_{diff}^{TA1}(t_1)$ at a time $t_1$, and by a second coordinate corresponding to its value of $I_P^{TA1}(t_1)$ at the same time $t_1$. Then, from this cross plot between the values of $I_P^{TA1}(t)$ and $P_{diff}^{TA1}(t)$ for a given lithology, we estimate a relation, a function, allowing to deduce the differential pressure from the seismic impedance. A simple relation such as a linear regression can for example be selected, but it is also possible to use more realistic relations commonly applied in rock physics (for example, Eberhardt-Phillips et al., 1989, Shapiro, 2003).

Figure 4:
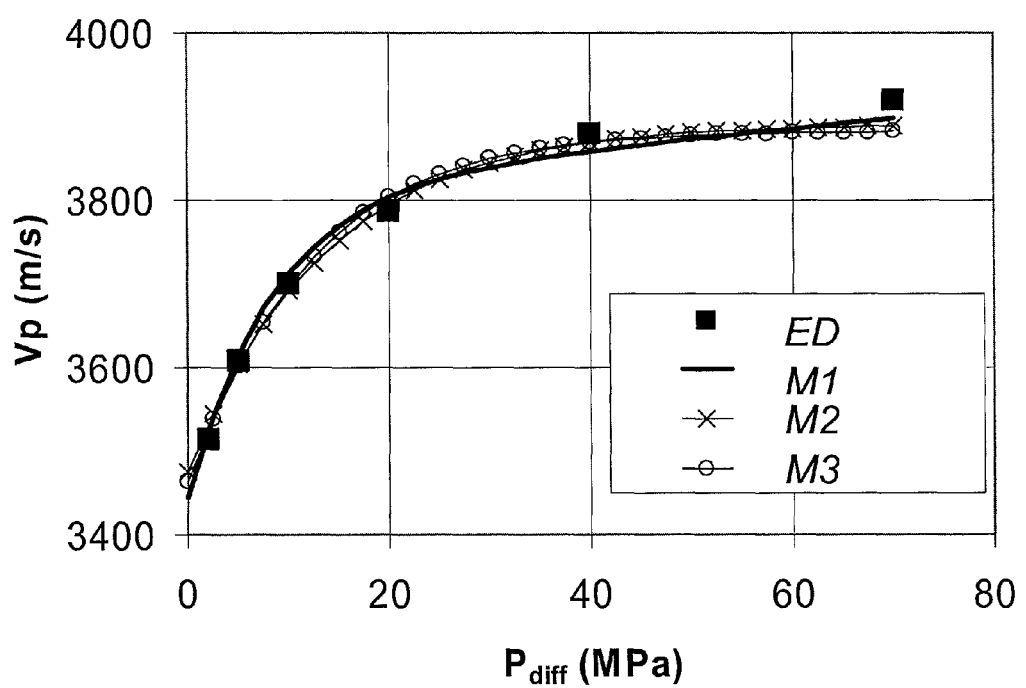
FIG. 4 shows an example of adjustment of experimental data to 3 petro-acoustic models $V_P=f(P_{diff})$.

FIG. 4 shows an example of the adjustment of a relation between the differential pressure and the velocity of the P waves obtained from experimental data (ED) resulting from sandstone analyses. The cross plot of this figure shows as the abscissa the differential pressure and as the ordinate the velocity of the P waves (we remind that $I_P(t)=\rho(t) \cdot V_P(t)$). We used three types of relation (M1, M2 and M3) taken from the previous references:

M1: $V_P = A + B \cdot P_{diff} - C \cdot e^{-D \cdot P_{diff}}$

M2: $V_P = A - C \cdot e^{-D \cdot P_{diff}}$

M3: $V_P = A/1 + C \cdot e^{-D \cdot P_{diff}}$

We then carry out the same operation, if necessary, for the seismic impedances $I_S^{TA1}(t)$. These relations are valid in the time analysis interval considered and they are the essential result of the well data analysis in petro-acoustic terms.

At the end of this well data analysis (WAL), relations (5) allow to define a relation representative of the entire zone studied (stage 7b):

$$I_P = f_{litho}(P_{diff}) \text{ and } I_S = g_{litho}(P_{diff}) \quad (6)$$

4) Determining a Differential Pressure Cube $P_{diff}(x, y, t)$ (Stage 8)

At the end of the analysis loops in the various time analysis intervals (until all the time intervals have been dealt with), we have, over the entire zone to be studied:

a P wave seismic impedance cube: $I_P(x, y, t)$; (stage 7a)

an S wave seismic impedance cube: $I_S(x, y, t)$; (stage 7a)

a lithoseismic facies cube: LithoS(x, y, t); (stage 7a)

the petro-acoustic relations (6):

$I_P = f_{litho}(P_{diff})$ and $I_S = g_{litho}(P_{diff})$; (stage 7b).

Thus, each facies being identified by function LithoS(x, y, t), the seismic impedance cubes $I_P(x, y, t)$ and $I_S(x, y, t)$ can be converted to a differential pressure cube $P_{diff}(x, y, t)$ (stage 8) using petro-acoustic relations (6).

5) Determining a Confining Pressure Cube $P_{conf}(x, y, t)$ (Stage 9)

Besides, using equations (2) and (3), a confining pressure cube $P_{conf}(x, y, t)$ can be obtained (stage 9) by means of the equation as follows:

$$P_{conf}(x, y, t) = \int_0^t \frac{1}{2} \rho(x, y, t) V_P(x, y, t) g \, dt \quad (7)$$

$$P_{conf}(x, y, t) = \int_0^t \frac{1}{2} I_P(x, y, t) g \, dt$$

It can be noted that, in the first equality, function $\rho(x, y, t)$ is unknown because the densities are only measured in the wells and they are poorly inverted by the seismic method (Barnola et al., 2003). However, the product of the density and of the P wave velocity being equal to the impedance $I_P(x, y, t)$, a quantity that is perfectly inverted by the seismic method (stage 5a), the latter equality is perfectly usable.

6) Determining a Fluid Pressure Cube $P_{pore}(x, y, t)$ (Stage 10)

The fluid pressure cube $P_{pore}(x, y, t)$ is obtained (stage 10) by simple subtraction between the confining pressure cube $P_{conf}(x, y, t)$ and the differential pressure cube $P_{diff}(x, y, t)$:

$$P_{pore}(x,y,t) = P_{conf}(x,y,t) - P_{diff}(x,y,t) \quad (8)$$

Thus, the method allows quantitative evaluation of the fluid pressures in form of 3D fluid pressure cubes $P_{pore}(x, y, t)$ by taking explicitly into account the lithology type.

7) Particular Embodiments

Determining Overpressure Zones in Time

From the method according to the invention, it is possible to predict, with a good spatial resolution, the possible overpressure zones that may be a danger during oil drilling for example. In fact, the 3D fluid pressure cube $P_{pore}(x, y, t)$ and the confining pressure cube $P_{conf}(x, y, t)$ being known, the user just has to select a threshold criterion to be applied to the pore pressure. The threshold can for example be selected equal to $0.9 * P_{conf}(x, y, t)$.

Determining Overpressure Zones in Depth

According to the method, it is also possible to obtain the same type of result in depth z and not in time t, which can be essential for defining the drilling conditions. In fact, the problem of switching from cubes in temporal coordinates to cubes in coordinates expressed in depth is a general problem that is well known in the field of seismic processing (Yilmaz, 1987, for example), and any method having proved its efficiency (vertical stretch, map migration, etc.) can be applied. In fact, such a conversion method simply allows to go from the "space-time" to the "depth space" using the conversion function of the time t variable to the depth z variable. We thus readily obtain a depth cube of the fluid pressures $P_{pore}(x, y, z)$. This quantitative evaluation of the fluid pressures in the subsoil obviously allows to locate, in depth this time, the abnormally high overpressure zones that may be a danger for oil drilling.

From this information, the trajectory of the wellbore can be modified to avoid these overpressure zones, or the drilling fluid injection pressure can be modified to compensate for the overpressure of the fluids in the subsoil.

It can be noted that this time/depth conversion is excellent in the vicinity of wells, good between wells and less reliable far away from wells and at depths that have not yet been reached by the wellbore.

Determining Overpressure Zones at Depths Not Yet Reached by Wellbores

The method allows to predict the fluid pressure values from, among other things, well data. Thus, if a depth has not yet been reached by wellbores, there are no data available for estimating the pressures and/or the overpressure zones. Subject to certain hypotheses detailed hereafter, it is however possible to extend the above analyses to depths not yet reached by wellbores.

First hypothesis: the depths not yet reached by the wellbore contain no new lithologies, i.e. lithologies that have not yet been encountered at the depths already reached. It is clear that, in the presence of new lithologies at greater depths, the proposed analysis is not suitable because no petrophysical law of the type described by equation (6), allowing conversion of the seismic parameters to pressure, would be available.

Second hypothesis: the lithoseismic facies and the petro-acoustic laws already obtained are not substantially changed and remain still valid.

Third hypothesis: the last wavelets necessary for inversion, and corresponding to the deepest time analysis interval reached by the wells, undergo no substantial change in the deeper levels.

Under such hypotheses, it is possible to extend the method to depths not yet reached by the wellbore, and thus to predict the overpressures at depths not yet reached by the wellbore. In other words, we evaluate the fluid pressures in the subsoil at depths not yet reached by the well by estimating the lithologies of depths not yet reached by a wellbore, by the lithologies of the depths already reached, and by applying for each lithoseismic facies the petro-acoustic laws and the wavelets corresponding to the deepest time analysis interval.

Problem of the Partial Unavailability of Surface Well Data

If the amount of well data available is not sufficient, not in terms of depth but in terms of logs (absence of logs allowing the density to be known for example), it is always possible to overcome this partial lack of data using conventional techniques. Thus, for example, in zones not investigated by certain logs (well data), we can take:

the velocity values estimated from the conventional velocity analyses, mentioned in the prior art,
the density values deduced from Gardner's empirical relations between density and velocities (Yilmaz, 1987, for example),
the pore pressure can be assumed to be hydrostatic, for lack of a more accurate evaluation method.

Complement to Conventional Methods

The invention can be judiciously used as a complement to conventional methods of quantitative fluid pressure evaluation through careful velocity analysis of the seismic data (Grauls and Dunand, 1995, for example).

By means of a conventional method, the distribution of the fluid pressures in the subsoil is roughly determined. These results, although insufficiently accurate, give a general idea of the distribution of the overpressure zones to be identified and described more finely. These zones are often the next zones to be prospected between existing but far away wells or at depths not yet reached.

The method according to the invention can then be applied only to the zones where an overpressure is suspected.

The method according to the invention thus allows to estimate fluid pressures in an underground zone, as well as overpressure zones, in time or in depth, even for depths that have not yet been reached. The method is characterized by a high spatial resolution in relation to conventional methods based on velocity analyses. It allows to define the drilling conditions (trajectory, drilling fluid pressure, etc.) because it provides very accurate results by taking account of the lithology from the processing start in a quantitative manner, and not in a qualitative manner and a posteriori as it is the case in conventional approaches. Finally, the method exploits to the maximum data acquired on the seismic scale, close to direct measurement, so as to avoid scale change problems (geologic, reservoir and seismic).

It can also be noted that, in order to simplify the description, the particular example is illustrated from particular data that do not limit the invention. Other well or seismic data can be used, such as for example multi-component seismic data.

The invention claimed is:

1. A method for evaluating fluid pressures in an underground zone by means of well data obtained from at least one well and seismic data comprising at least one seismic cube discretizing said zone into elementary volumes located by their horizontal (x,y) and vertical coordinates in time (t), the method comprising the following stages:
   a) defining at least one time analysis interval for said zone,
   b) performing in said analysis interval a pre-stack stratigraphic inversion of said seismic data, using geological a priori information, so as to construct at least one seismic impedance cube,
   c) determining a lithoseismic facies cube by carrying out a lithoseismic analysis comprising interpretation of said seismic impedance cube in terms of lithoseismic facies from said well data,
   d) using said well data to determine seismic impedances in said well expressed in time, as well as differential pressures in said well expressed in time,
   e) determining for each of said lithoseismic facies at least one petro-acoustic relation connecting said seismic impedances in said well to said differential pressures in said well, in said analysis interval,
   f) determining a differential pressure cube by converting said seismic impedance cube by means of said petro-acoustic relation and said lithoseismic facies cube,
   g) determining a confining pressure cube from said seismic impedance cube,
   h) determining said fluid pressures over all of said zone, by calculating the difference between said differential pressures and said confining pressures.

2. A method as claimed in claim 1, wherein said seismic data are 3D P wave monocomponent seismic data partially stacked by angle class after preserved amplitude processing and NMO correction.

3. A method as claimed in claim 2, wherein said pre-stack stratigraphic inversion comprises the following stages:
   extracting for each angle class a wavelet coherent with said well data,
   constructing an a priori model comprising a P wave impedance a priori cube and an S wave impedance a priori cube,
   performing a pre-stack stratigraphic inversion of all the cubes defined for each angle class, from said wavelet and said a priori model.

4. A method as claimed in claim 1, wherein the lithoseismic analysis comprises a generalized principal component analysis followed by a lithoseismic facies analysis calibrated by means of said well data.

5. A method as claimed in claim 1, wherein the lithoseismic analysis allows at least to discriminate between clayey facies and sandy facies.

6. A method as claimed in claim 1, wherein said well data comprise at least the following depth data (z):
   seismic velocities obtained from acoustic logs,
   total density $\rho(z)$,
   fluid pressure $P_{pore}(z)$.

7. A method as claimed in claim 6, wherein said well data provided as a function of depth z are converted as function of time t, from the following formula:

$$t = \int_0^z \frac{2dz}{V_P(z)}$$

where $V_p(z)$ represents the P wave seismic velocities.

8. A method as claimed in claim 7, wherein said petro-acoustic relation is determined in time, by carrying out the following stages:
 calculating for said well seismic impedances from the total density and said seismic velocities,
 calculating confining pressures from the seismic velocity and total density data, for each time interval of the well data,
 calculating differential pressures by the difference between the fluid pressure in said well $P_{pore}(t)$ and the confining pressure, for each time interval of the well data,
 estimating a relation from the seismic velocity data and the differential pressure data.

9. A method as claimed in claim 1, wherein said confining pressure cube $P_{conf}(x, y, t)$ is determined from the following equation:

$$P_{conf}(x, y, t) = \int_0^t \frac{1}{2} I_P(x, y, t) g \, dt$$

where $I_p(x, y, t)$ represents an acoustic impedance cube.

10. A method as claimed in claim 1, wherein overpressure zones are detected for a wellbore, by applying a threshold criterion to said fluid pressures.

11. A method as claimed in claim 1, wherein a time/depth conversion of said evaluated fluid pressures is carried out.

12. A method as claimed in claim 11, wherein overpressure zones are located in depth and the drilling conditions are modified according to the location and the intensity of the overpressure zones.

13. A method as claimed in claim 12, wherein the trajectory of the wellbore is modified to avoid said overpressure zones.

14. A method as claimed in claim 12, wherein the drilling fluid injection pressure is modified to compensate for underground fluid overpressures.

15. A method as claimed in claim 1, wherein said underground fluid pressures are evaluated at depths that have not yet been reached by the wellbore, by estimating lithologies of depths not yet reached by a wellbore by means of said lithologies of depths already reached, and by applying for each of said lithoseismic facies said petro-acoustic laws and said wavelets corresponding to the deepest time analysis interval.

16. A method as claimed in claim 15, wherein the overpressure zones are predicted at depths not yet reached by the wellbore.

17. A method as claimed in claim 1, wherein the fluid pressures are assumed to be hydrostatic and at least one of the following data is used:
 seismic velocities estimated from conventional velocity analyses,
 densities estimated from said seismic velocities estimated by means of Gardner's empirical relations.

* * * * *